United States Patent
Hirayama (10) Patent No.: US 9,113,019 B2
(45) Date of Patent: Aug. 18, 2015

(54) IMAGE READING APPARATUS, IMAGE FORMING APPARATUS, DOCUMENT SHEET WIDTH DETECTING METHOD

(71) Applicant: KYOCERA Document Solutions Inc., Osaka-shi, Osaka (JP)

(72) Inventor: Hayato Hirayama, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/580,031

(22) Filed: Dec. 22, 2014

(65) Prior Publication Data

US 2015/0181051 A1   Jun. 25, 2015

(30) Foreign Application Priority Data

Dec. 25, 2013 (JP) .................. 2013-267876

(51) Int. Cl.
*H04N 1/40* (2006.01)
*G06K 15/00* (2006.01)
*B65H 1/04* (2006.01)
*B65H 1/08* (2006.01)
*B65H 7/20* (2006.01)
*H04N 1/00* (2006.01)
*H04N 1/60* (2006.01)

(52) U.S. Cl.
CPC ......... *H04N 1/0071* (2013.01); *H04N 1/00689* (2013.01); *H04N 1/00692* (2013.01); *H04N 1/00737* (2013.01); *H04N 1/00774* (2013.01); *H04N 1/6002* (2013.01)

(58) Field of Classification Search
USPC ........................................................ 358/2.99
See application file for complete search history.

(56) References Cited

U.S. PATENT DOCUMENTS 4,698,511 A * 10/1987 Sueda et al. ............. 250/559.19
2006/0139703 A1* 6/2006 Kurokawa et al. ............ 358/474

FOREIGN PATENT DOCUMENTS

JP              61183637 B2     8/1986

* cited by examiner

*Primary Examiner* — King Poon
*Assistant Examiner* — Ibrahim Sidoo
(74) *Attorney, Agent, or Firm* — Alleman Hall McCoy Russell & Tuttle LLP (57) ABSTRACT

In image reading apparatus, reading control portion causes image reading portion to read at least line of image data when pivoting angle of cover member with respect to document sheet table has changed from angle exceeding predetermined detection angle to angle equal to or less than detection angle. Photoelectric conversion portion is disposed in area that is out of predetermined maximum readable size area in image reading portion, and is covered by cover member when cover member is closed. Data correcting portion corrects image data read by reading control portion, based on output of photoelectric conversion portion output when pivoting angle has changed from angle exceeding detection angle to angle that is equal to or less than detection angle. Document sheet width detecting portion detects width, in main scanning direction, of document sheet placed on document sheet mounting surface, based on image data corrected by data correcting portion.

9 Claims, 5 Drawing Sheets

IMAGE READING APPARATUS, IMAGE FORMING APPARATUS, DOCUMENT SHEET WIDTH DETECTING METHOD

INCORPORATION BY REFERENCE

This application is based upon and claims the benefit of priority from the corresponding Japanese Patent Application No. 2013-267876 filed on Dec. 25, 2013, the entire contents of which are incorporated herein by reference.

BACKGROUND

The present disclosure relates to an image reading apparatus for detecting the size of a document sheet placed on a document sheet mounting surface, an image forming apparatus, and a document sheet width detecting method.

In general, in an image reading apparatus such as a scanner that can read an image from a document sheet, the size of a document sheet placed on a document sheet mounting surface may be detected before an image reading process is executed. For example, there is known a technology for detecting the size of a document sheet by reading image data by irradiating light from a reading unit immediately before a document sheet cover is closed by the user, and identifying a document sheet area and an out-of-document-sheet area from the read image data.

SUMMARY

An image reading apparatus according to an aspect of the present disclosure includes a document sheet table, a cover member, an image reading portion, a reading control portion, a photoelectric conversion portion, a data correcting portion, and a document sheet width detecting portion. The includes a document sheet mounting surface. The cover member is pivotably supported with respect to the document sheet table. The image reading portion is configured to read image data from a document sheet placed on the document sheet mounting surface. The reading control portion is configured to cause the image reading portion to read at least a line of the image data when a pivoting angle of the cover member with respect to the document sheet table has changed from an angle exceeding a predetermined detection angle to an angle that is equal to or less than the detection angle. The photoelectric conversion portion is disposed in an area that is out of a predetermined maximum readable size area in the image reading portion, and is covered by the cover member when the cover member is closed. The data correcting portion is configured to correct the image data read by the reading control portion, based on an output of the photoelectric conversion portion which is output when the pivoting angle has changed from an angle exceeding the detection angle to an angle that is equal to or less than the detection angle. The document sheet width detecting portion is configured to detect a width, in a main scanning direction, of the document sheet placed on the document sheet mounting surface, based on the image data corrected by the data correcting portion.

An image forming apparatus according to another aspect of the present disclosure includes the image reading apparatus and an image forming portion. The image forming portion is configured to form an image based on image data read by the image reading apparatus.

A document sheet width detecting method according to a further aspect of the present disclosure is executed by an image reading apparatus including: a document sheet table including a document sheet mounting surface; a cover member pivotably supported with respect to the document sheet table; an image reading portion configured to read image data from a document sheet placed on the document sheet mounting surface; and a photoelectric conversion portion disposed in an area that is out of a predetermined maximum readable size area in the image reading portion, and is covered by the cover member when the cover member is closed. The document sheet width detecting method includes the following first step to third step. The first step causes the image reading portion to read at least a line of the image data when a pivoting angle of the cover member with respect to the document sheet table has changed from an angle exceeding a predetermined detection angle to an angle that is equal to or less than the detection angle. The second step corrects the image data read in the first step, based on an output of the photoelectric conversion portion which is output when the pivoting angle has changed from an angle exceeding the detection angle to an angle that is equal to or less than the detection angle. The third step detects a width, in a main scanning direction, of the document sheet placed on the document sheet mounting surface, based on the image data corrected in the second step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings for the understanding of the disclosure. It should be noted that the following description is an example of a specific embodiment of the present disclosure and should not limit the technical scope of the present disclosure.

[Outlined Configuration of Image Forming Apparatus 10]

Figure 1A:
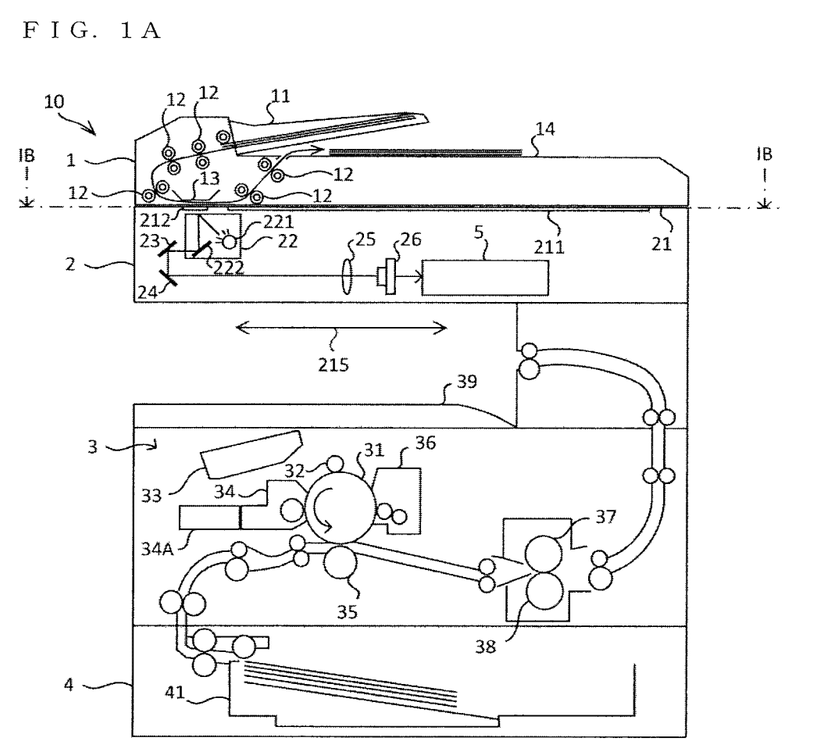
FIGS. 1A and 1B are diagrams showing the configuration of an image forming apparatus according to an embodiment of the present disclosure.
Figure 1B:
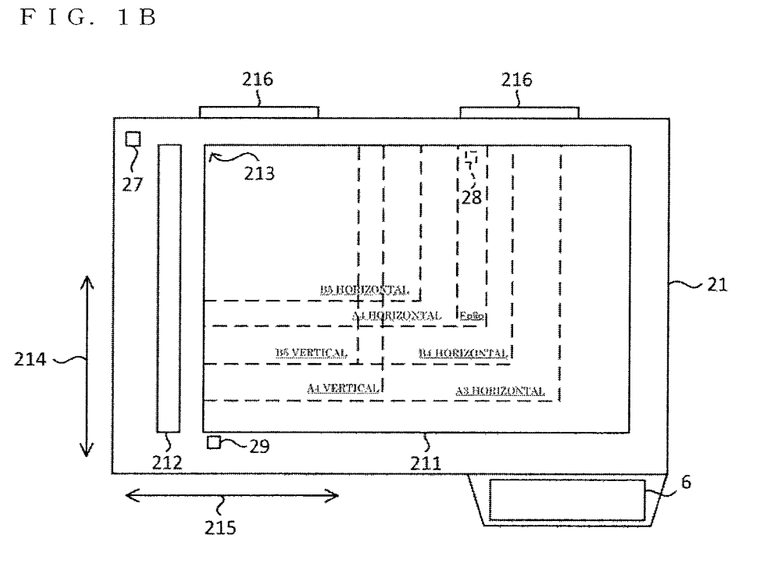

First, an outlined configuration of an image forming apparatus 10 in an embodiment of the present disclosure is described with reference to FIGS. 1A through 2. Here, FIG. 1A is a schematic cross-sectional view of the image forming apparatus 10. FIG. 1B is a figure taken along the 1B-1B line of FIG. 1A and viewed from a direction indicated by the arrows.

Figure 2:
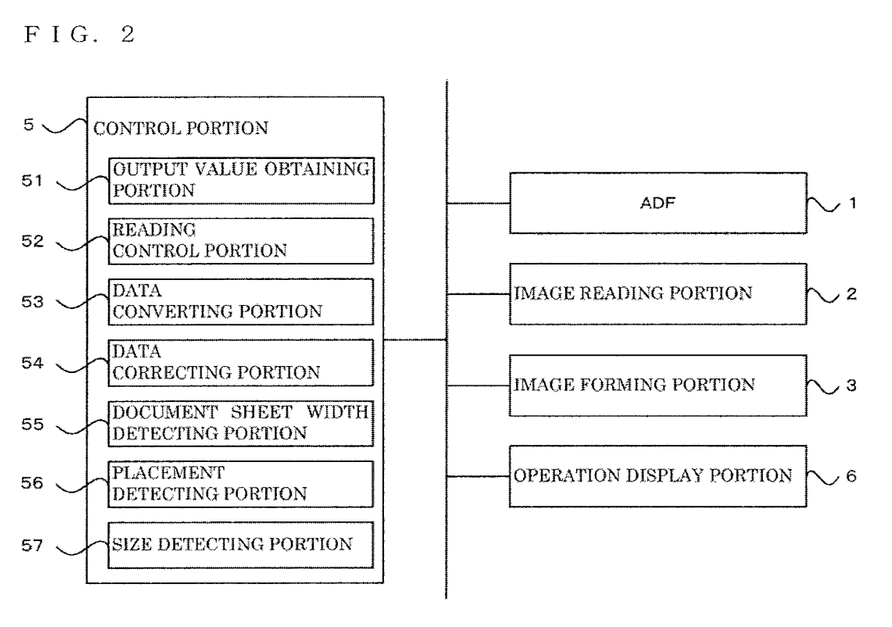
FIG. 2 is a block diagram showing the system configuration of the image forming apparatus according to an embodiment of the present disclosure.

As shown in FIGS. 1A through 2, the image forming apparatus 10 includes an ADF 1, an image reading portion 2, an image forming portion 3, a sheet feed portion 4, a control portion 5, and an operation display portion 6. The image forming apparatus 10 is a multifunction peripheral having a plurality of functions such as a printer function, a facsimile function, and/or a copy function, as well as a scan function to read image data from a document sheet. It is noted that, in the image forming apparatus 10, a configuration including the ADF 1, the image reading portion 2, and the control portion 5 is an example of the image reading apparatus of the present disclosure. In addition, the present disclosure is applicable to an image reading apparatus or an image forming apparatus such as a scanner, a facsimile apparatus, and a copier.

The image forming portion 3 is an image forming portion adopting the electrophotography and executes an image forming process (print process) based on the image data which is read by the image reading portion 2 or input from an external information processing apparatus such as a personal computer. Specifically, as shown in FIG. 1A, the image forming portion 3 includes a photoconductor drum 31, a charging device 32, an exposure device (LSU) 33, a developing device 34, a transfer roller 35, a cleaning device 36, a fixing roller 37, a pressure roller 38, and a discharge tray 39. In the image forming portion 3, an image is formed in the following procedure on a paper sheet supplied from a sheet feed cassette 41 that is attachable and detachable to/from the sheet feed portion 4. The paper sheet with the image formed thereon is discharged onto the discharge tray 39.

First, the charging portion 32 charges the surface of the photoconductor drum 31 uniformly into a certain potential. Next, the exposure device 33 irradiates the surface of the photoconductor drum 31 with light based on the image data. With this operation, an electrostatic latent image corresponding to the image data is formed on the surface of the photoconductor drum 31. Then the electrostatic latent image on the photoconductor drum 31 is developed (made visible) into a toner image by the developing device 34. It is noted that the toner (developer) is supplied to the developing device 34 from a toner container 34A that is attachable and detachable to/from the image forming portion 3. Subsequently, the toner image formed on the photoconductor drum 31 is transferred to a paper sheet by the transfer roller 35. The print sheet is then conveyed to pass through between the fixing roller 37 and the pressure roller 38, where the toner image having been transferred to the paper sheet is heated by the fixing roller 37 so as to be fused and fixed to the paper sheet. It is noted that the toner remaining on the surface of the photoconductor drum 31 is removed by the cleaning device 36.

The control portion 5 includes control equipment such as CPU, ROM, RAM, and EEPROM (registered trademark) that are not shown. The CPU is a processor for executing various types of arithmetic processes. The ROM is a nonvolatile storage portion in which various types of information such as control programs for causing the CPU to execute various types of processes are stored in advance. The RAM is a volatile storage portion, and the EEPROM is a nonvolatile storage portion. The RAM and the EEPROM are used as temporary storage memories (working areas) for the various types of processes executed by the CPU. The control portion 5 comprehensively controls the image processing apparatus 10 by causing the CPU to execute the various types of control programs that have been stored in advance in the ROM. It is noted that the control portion 5 may be formed as an electronic circuit such as an integrated circuit (ASIC). Alternatively, the control portion 5 may be a control portion provided independently of a main control portion that comprehensively controls the image processing apparatus 10.

The operation display portion 6 includes a display portion and an operation portion. The display portion is, for example, a liquid crystal display and displays various types of information based on control instructions from the control portion 5. The operation portion is composed of, for example, hard keys or a touch panel through which various types of information are input to the control portion 5 based on user's operations.

As shown in FIG. 1A, the ADF 1 is an automatic document sheet feeding device and includes a document sheet setting portion 11, a plurality of conveying rollers 12, a document sheet pressing 13, and a sheet discharge portion 14. The ADF 1 is pivotably supported with respect to the document sheet table 21 that is described below, and also serves as a document sheet cover for covering the document sheet placed on the document sheet mounting surface 211 of the document sheet table 21. In the ADF 1, the plurality of conveying rollers 12 are driven by a motor (not shown) such that the document sheet placed on the document sheet setting portion 11 is conveyed to pass through an image data reading position where the image data is read by the image reading portion 2, and then conveyed to the sheet discharge portion 14. With this configuration, the image reading portion 2 can read image data from the document sheet conveyed by the ADF 1. Here, the ADF 1 is an example of the cover member.

The image reading portion 2 is an image reading portion that can read image data from the document sheet. Specifically, as shown in FIGS. 1A and 1B, the image reading portion 2 includes a document sheet table 21, a reading unit 22, mirrors 23, 24, an optical lens 25, a CCD (Charge Coupled Device) 26, an opening/closing detecting sensor 27, a placement detecting sensor 28, and a photoelectric conversion portion 29.

The document sheet table 21 is provided on the upper surface of the image reading portion 2, and as shown in FIG. 1B, includes a document sheet mounting surface 211 and a conveying-and-reading surface 212. The document sheet mounting surface 211 is translucent contact glass on which a document sheet, from which image data is to be read, is placed. Document sheets of various sizes can be placed on the document sheet mounting surface 211 to be positioned at a predetermined mounting reference position 213. Specifically, document sheets of B5 vertical, A4 vertical, B5 horizontal, A4 horizontal, Folio, B4 horizontal, and A3 horizontal sizes can be placed on the document sheet mounting surface 211. The conveying-and-reading surface 212 is glass and allows light that was irradiated from the reading unit 22 toward the document sheet conveyed by the ADF 1, to transmit therethrough. It is noted that hinges 216 for pivotably supporting the ADF 1 are attached to the document sheet table 21. The ADF 1 is allowed to pivot around the hinges 216 as a pivoting axis, and functions as a document sheet cover with respect to the document sheet placed on the document sheet mounting surface 211.

The reading unit 22 includes a light source 221 and a mirror 222, and is configured to be driven and moved in a sub scanning direction 215 (the left-right direction in FIG. 1A) by a moving mechanism (not shown) that uses a driving portion such as a stepping motor. When the reading unit 22 is moved in the sub scanning direction 215 by the driving portion, the light irradiated from the light source 221 toward the document sheet table 21 is scanned in the sub scanning direction 215. It is noted that, in the wait state before the image reading process is executed by the image reading portion 2, the reading unit 22 is moved to the home position by the moving mechanism. For example, the home position is an end of the document sheet mounting surface 211 on the mounting reference position 213 side in the sub scanning direction 215.

The light source 221 includes a number of white LEDs arranged along the main scanning direction 214 (the depth direction in FIG. 1A). The light source 221 irradiates the document sheet with a line of white light extending in the main scanning direction 214, by causing the white light to pass through the document sheet mounting surface 211 or the conveying-and-reading surface 212 of the document sheet table 21. A light irradiation position where the light is irradiated by the light source 221 is an image data reading position where the image data is read by the image reading portion 2. The reading position moves in the sub scanning direction 215 as the reading unit 22 moves in the sub scanning direction 215. Specifically, when image data is to be read from a document sheet placed on the document sheet mounting surface 211, the reading unit 22 is moved to a position where the light irradiated by the light source 221 passes through the document sheet mounting surface 211. In addition, when image data is to be read from a document sheet conveyed by the ADF 1, the reading unit 22 is moved to a position where the light irradiated by the light source 221 passes through the conveying-and-reading surface 212.

The mirror 222 reflects, toward the mirror 23, light which was irradiated from the light source 221 and reflected on the surface of the document sheet at the reading position on the document sheet table 21. The light reflected on the mirror 222 is guided into the optical lens 25 by the mirrors 23 and 24. The optical lens 25 condenses the light incident from the mirror 24 and makes the condensed light incident on the CCD 26.

The CCD 26 is an image sensor including a photoelectric converting element that converts the received light into an electric signal (voltage), which corresponds to an amount of the received light, and outputs the electric signal as the image data. Upon receiving light incident from the light source 221, the CCD 26 inputs an electric signal to the control portion 5 as image data of the document sheet, wherein the light is based on the incident light that was reflected on the document sheet.

The opening/closing detecting sensor 27 is a sensor for detecting that the pivoting angle of the ADF 1 with respect to the document sheet table 21 has changed from an angle exceeding a predetermined detection angle to an angle that is equal to or less than the detection angle. For example, the opening/closing detecting sensor 27 is a mechanical switch that, when the pivoting angle has changed from an angle exceeding the detection angle to an angle that is equal to or less than the detection angle, can contact the ADF 1 and output an electric signal indicating a closing operation of the ADF 1. Here, when the pivoting angle of the closed ADF 1 is 0 degree, the detection angle is, for example, 10 to 20 degrees. The electric signal output from the opening/closing detecting sensor 27 is input to the control portion 5.

The placement detecting sensor 28 is a sensor for detecting whether a document sheet is present or absent at a predetermined detection position on the document sheet mounting surface 211. Here, the detection position in the image forming apparatus 10 is within a Folio size document sheet that is placed on the document sheet mounting surface 211 to be positioned at the mounting reference position 213, and is outside of an edge of an A4 horizontal size document sheet in the sub scanning direction 215. For example, the placement detecting sensor 28 is a reflection type light sensor provided on the bottom of the image reading portion 2, below the detection position, and includes a light emitting portion and a light receiving portion. The placement detecting sensor 28 emits light from the light emitting portion toward the detection position in the state where the ADF 1 is not closed. This enables an electric signal indicating presence or absence of a document sheet to be output from the light receiving portion. The electric signal output from the placement detecting sensor 28 is input to the control portion 5.

Meanwhile, there is known a technology which, immediately before the user closes the ADF 1, causes the reading unit 22 to irradiate light and read the image data, identifies a document sheet area and an out-of-document-sheet area from the read image data, and detects the size of the document sheet placed on the document sheet mounting surface 211. However, in such a case where the image data is read immediately before the ADF 1 is closed, external light, such as light of the room lamp, may be incident on the document sheet mounting surface 211 from a gap between the ADF 1 and the document sheet table 21, thereby decreasing the detection accuracy of the document sheet size. On the other hand, in the image forming apparatus 10, the read image data is corrected based on the output of the photoelectric conversion portion 29 that is output immediately before the ADF 1 is closed. This improves the detection accuracy of the document sheet size.

Figure 3A:
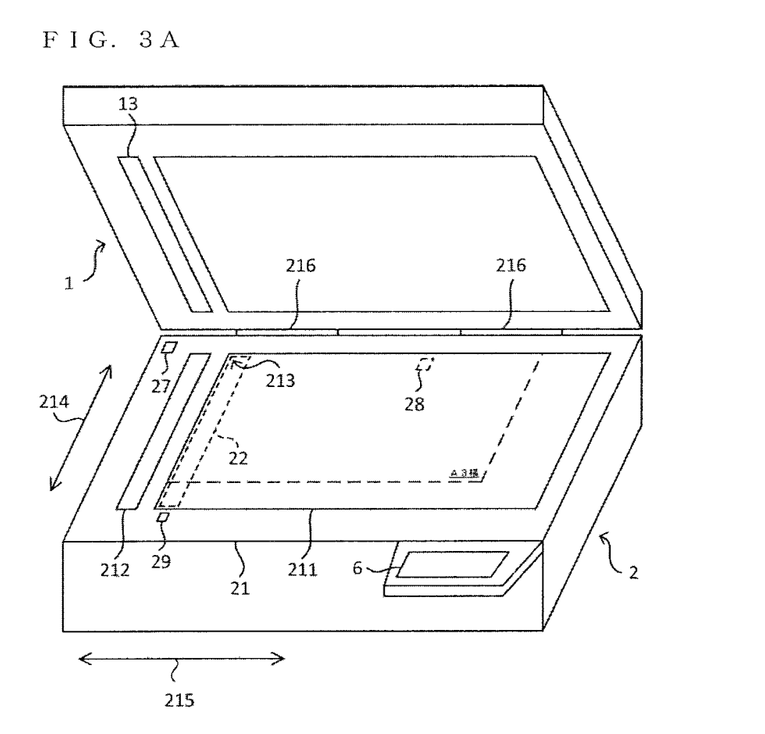
FIGS. 3A and 3B are diagrams showing an example of the arrangement position of a photoelectric conversion portion of the image forming apparatus according to an embodiment of the present disclosure.
Figure 3B:
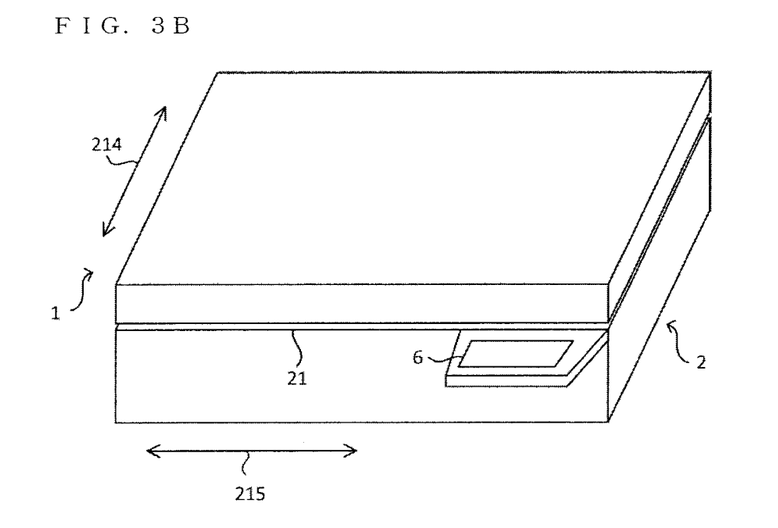

Here, the photoelectric conversion portion 29 is explained with reference to FIGS. 3A and 3B. It is noted that FIGS. 3A and 3B are perspective views of the ADF 1 and the image reading portion 2. FIG. 3A shows the state where the ADF 1 is opened. FIG. 3B shows the state where the ADF 1 is closed. It is noted that, in FIGS. 3A and 3B, the configuration of the ADF 1 is shown in a simplified form.

As shown in FIGS. 3A and 3B, the photoelectric conversion portion 29 is disposed in an area that is out of a predetermined maximum readable size area in the image reading portion 2, and is covered by the ADF 1 when the ADF 1 is closed. Here, the maximum readable size in the image forming apparatus 10 is an area corresponding to an A3 horizontal size document sheet placed on the document sheet mounting surface 211 to be positioned at the mounting reference position 213.

The photoelectric conversion portion 29 is an photoelectric conversion element that outputs power in correspondence with the amount of received light. For example, the photoelectric conversion portion 29 may be a solar battery that includes a plurality of photoelectric conversion elements connected in series or in parallel, and converts the light energy into the electric energy. It is noted that the photoelectric conversion portion 29 may be a photodiode or the like. The power output from the photoelectric conversion portion 29 is converted by an electronic circuit (not shown) into data indicating a power value, and the data is input to the control portion 5.

As shown in FIG. 3A, in the image forming apparatus 10, the photoelectric conversion portion 29 is disposed outside of, among opposite edges of the document sheet mounting surface 211 of the document sheet table 21 in the main scanning direction 214, an edge that is farther from the hinges 216. In addition, the position of the photoelectric conversion portion 29 in the sub scanning direction 215 is the same as the home position. It is noted that the installation position of the photoelectric conversion portion 29 is not limited to this position. For example, the installation position of the photoelectric conversion portion 29 may be on the reading unit 22, or on the bottom of the image reading portion 2 below the document sheet mounting surface 211. Furthermore, a plurality of photoelectric conversion portions 29 may be provided.

As shown in FIG. 2, the control portion 5 includes an output value obtaining portion 51, a reading control portion 52, a data converting portion 53, a data correcting portion 54, a document sheet width detecting portion 55, a placement detecting portion 56, and a size detecting portion 57.

Specifically, a size detecting program for causing the CPU to execute a size detecting process (see FIG. 4) described below is stored in advance in the ROM or the EEPROM of the control portion 5. It is noted that the size detecting program may be recorded on a computer-readable recording medium such as a CD, a DVD, or a flash memory, and the program may be read from the recording medium and installed in a storage portion such as the EEPROM of the control portion 5. The control portion 5 functions as the output value obtaining portion 51, reading control portion 52, data converting portion 53, data correcting portion 54, document sheet width detecting portion 55, placement detecting portion 56, and size detecting portion 57 when it executes, by using the CPU, the size detecting program stored in the ROM. It is noted that when the control portion 5 is an electronic circuit, the output value obtaining portion 51, reading control portion 52, data converting portion 53, data correcting portion 54, document sheet width detecting portion 55, placement detecting portion 56, and size detecting portion 57 are configured as modules included in the control portion 5.

The output value obtaining portion 51 obtains an output value of the photoelectric conversion portion 29 when the pivoting angle of the ADF 1 with respect to the document sheet table 21 has changed from an angle exceeding the detection angle to an angle that is equal to or less than the detection angle. Specifically, the output value obtaining portion 51 obtains the output value of the photoelectric conversion portion 29 when it detects, based on the electric signal output from the opening/closing detecting sensor 27, that the pivoting angle has changed from an angle exceeding the detection angle to an angle that is equal to or less than the detection angle. In addition, the output value obtaining portion 51 obtains the output value of the photoelectric conversion portion 29 by reading the data indicating the power value that was converted by the electronic circuit from the power output from the photoelectric conversion portion 29.

The reading control portion 52 causes the image reading portion 2 to read at least a line of the image data when the pivoting angle of the ADF 1 with respect to the document sheet table 21 has changed from an angle exceeding the detection angle to an angle that is equal to or less than the detection angle. Specifically, the reading control portion 52 causes the image reading portion 2 to read the image data when it detects, based on the electric signal output from the opening/closing detecting sensor 27, that the pivoting angle has changed from an angle exceeding the detection angle to an angle that is equal to or less than the detection angle. Here, the reading control portion 52 causes the image reading portion 2 to read the image data after the output value obtaining portion 51 obtains the output value of the photoelectric conversion portion 29. For example, the reading control portion 52 causes the reading unit 22 that is in the wait state at the home position, to read a line of or a several lines of the image data, with the home position being set as the reading position.

The data converting portion 53 binalizes the image data read by the reading control portion 52, into two density levels based on a predetermined threshold value. Specifically, the data converting portion 53 binalizes the image data by converting each of the pixels included in the image data into a low-density pixel or a high-density pixel, based on the threshold value. It is noted that, as the threshold value, a value stored in a storage portion such as the EEPROM of the control portion 5 is used. For example, in the image forming apparatus 10, when the density of each pixel of the image data is represented by 256 gradation levels, and density value 0 represents white, and density value 255 represents black, a value 128 may be determined as the threshold value. Furthermore, with regard to each of the pixels constituting the image data, the data converting portion 53 converts the density value of a pixel into 0 when it is lower than the threshold value, and converts it into 1 when it is equal to or higher than the threshold value.

The data correcting portion 54 corrects the image data read by the reading control portion 52, based on the output value of the photoelectric conversion portion 29 obtained by the output value obtaining portion 51. Specifically, the data correcting portion 54 corrects the image data by changing the threshold value based on the output value of the photoelectric conversion portion 29. For example, in the image forming apparatus 10, a storage portion such as the EEPROM stores table data in which the output values of the photoelectric conversion portion 29 and the amounts of change in the threshold value are associated with each other. The data correcting portion 54 can obtain an amount of change in the threshold value that is associated with an output value of the photoelectric conversion portion 29, by referring to the table data. Here, the data correcting portion 54 changes the threshold value by decreasing the threshold value by the obtained amount of change in the threshold value. It is noted that when, in the image forming apparatus 10, density value 0 represents black, and density value 255 represents white, the data correcting portion 54 changes the threshold value by increasing the threshold value by the obtained amount of change in the threshold value.

The document sheet width detecting portion 55 detects the width, in the main scanning direction 214, of the document sheet placed on the document sheet mounting surface 211, based on the image data binalized into two density levels by the data converting portion 53. Specifically, the document sheet width detecting portion 55 detects the width in the main scanning direction 214 of the document sheet by identifying, from the binalized image data, the boundary between the document sheet area and the out-of-document-sheet area. For example, the document sheet width detecting portion 55 identifies an area that is the farthest from the mounting reference position 213, from among areas of the image data that include a predetermined number or more of continuous pixels of density value 0, and identifies, among opposite edges of the identified area in the main scanning direction 214, an edge that is farther from the mounting reference position 213, as the boundary between the document sheet area and the out-of-document-sheet area.

The placement detecting portion 56 is configured to detect whether a document sheet is present or absent at the detection position on the document sheet mounting surface 211. Specifically, when the pivoting angle of the ADF 1 with respect to the document sheet table 21 has changed from an angle exceeding the detection angle to an angle that is equal to or less than the detection angle, the placement detecting portion 56 causes the light emitting portion of the placement detecting sensor 28 to emit light, and detects whether a document sheet is present or absent at the detection position, based on an electric signal output from the light receiving portion.

The size detecting portion 57 detects the size of the document sheet placed on the document sheet mounting surface 211, based on the detection results of the document sheet width detecting portion 55 and the placement detecting portion 56. Specifically, the size detecting portion 57 refers to data that is stored in advance in a storage portion such as the EEPROM and indicates various sizes of document sheets, and extracts, from the data, a size of the document sheet that matches the width of the document sheet detected by the document sheet width detecting portion 55. When a size of the document sheet is extracted, the size detecting portion 57 determines the extracted size as the size of the document sheet placed on the document sheet mounting surface 211 that the size detecting portion 57 should detect. On the other hand, when a plurality of sizes of the document sheet are extracted, the size detecting portion 57 selects one of the extracted sizes of the document sheet based on the detection result of the placement detecting portion 56, and determines the selected size as the size of the document sheet placed on the document sheet mounting surface 211. For example, when the document sheet width detected by the document sheet width detecting portion 55 matches A4 vertical and A3 horizontal sizes, and the placement detecting portion 56 detects that a document sheet is present, the size detecting portion 57 determines that the size of the document sheet placed on the document sheet mounting surface 211 is A3 horizontal. In addition, when the document sheet width detected by the document sheet width detecting portion 55 matches A4 vertical and A3 horizontal sizes, and the placement detecting portion 56 detects that a document sheet is absent, the size detecting portion 57 determines that the size of the document sheet placed on the document sheet mounting surface 211 is A4 vertical.

[Size Detecting Process]

Figure 4:
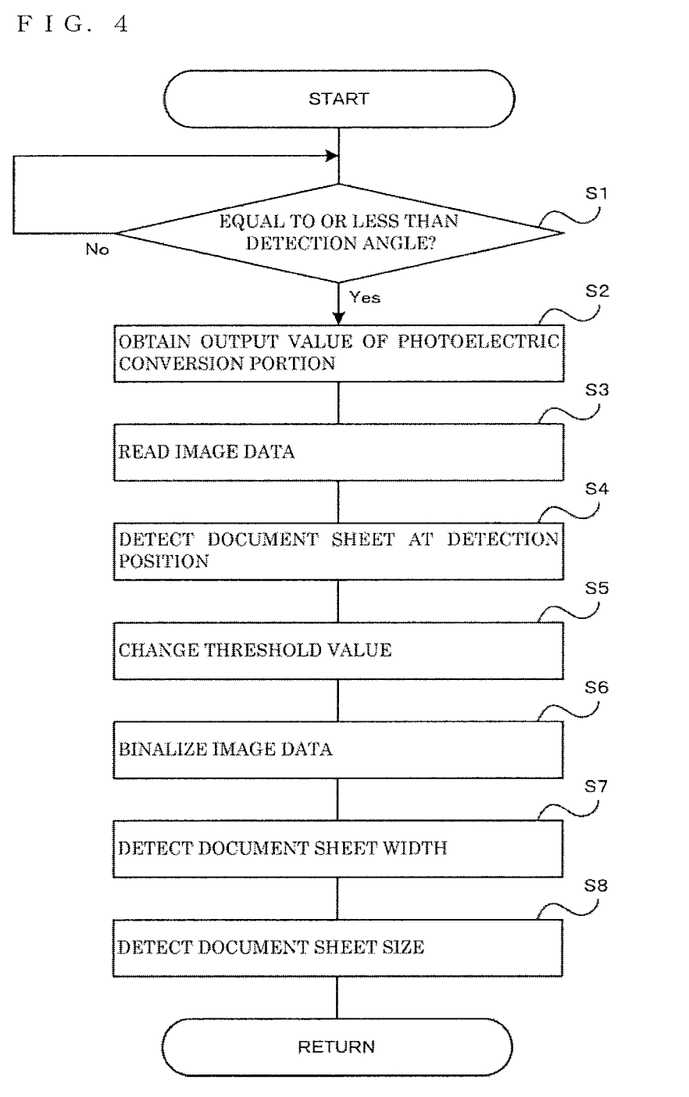
FIG. 4 is a flowchart showing an example of the size detecting process executed by the image forming apparatus according to an embodiment of the present disclosure.

The following describes, with reference to FIG. 4, an example of the procedure of the size detecting process that the control portion 5 executes in accordance with the size detecting program in the image forming apparatus 10. Here, steps S1, S2, . . . represent numbers of the processing procedures (steps) executed by the control portion 5.

<Step S1>

First, in step S1, the control portion 5 determines whether or not the pivoting angle of the ADF 1 with respect to the document sheet table 21 has changed from an angle exceeding the detection angle to an angle that is equal to or less than the detection angle. Specifically, the control portion 5 determines, based on the electric signal output from the opening/closing detecting sensor 27, whether or not the pivoting angle has changed from an angle exceeding the detection angle to an angle that is equal to or less than the detection angle.

Here, when the control portion 5 determines that the pivoting angle has changed from an angle exceeding the detection angle to an angle that is equal to or less than the detection angle (Yes side at S1), the control portion 5 moves the process to step S2. In addition, when the control portion 5 determines that the pivoting angle has not changed from an angle exceeding the detection angle to an angle that is equal to or less than the detection angle (No side at S1), the control portion 5 waits at step S1 for the pivoting angle to change from an angle exceeding the detection angle to an angle that is equal to or less than the detection angle.

<Step S2>

In step S2, the control portion 5 obtains an output value of the photoelectric conversion portion 29. Specifically, the control portion 5 obtains the output value of the photoelectric conversion portion 29 by reading the data indicating the power value that was converted by the electronic circuit from the power output from the photoelectric conversion portion 29. Here, the process of the step S2 is executed by the output value obtaining portion 51 of the control portion 5.

<Step S3>

In step S3, the control portion 5 causes the image reading portion 2 to read a line of the image data. Specifically, the control portion 5 causes the reading unit 22 that is in the wait state at the home position, to read a line of the image data, with the home position being set as the reading position. Here, the process of the step S3 is an example of the first step and executed by the reading control portion 52 of the control portion 5.

Here, in the size detecting process, when the pivoting angle of the ADF 1 with respect to the document sheet table 21 has changed from an angle exceeding the detection angle to an angle that is equal to or less than the detection angle, after the control portion 5 obtains an output value of the photoelectric conversion portion 29, the control portion 5 causes the image reading portion 2 to read a line of the image data. This prevents the output value of the photoelectric conversion portion 29 obtained by the control portion 5 from reflecting the light emitted from the light source 221 during the reading operation of the image reading portion 2.

In addition, as shown in FIG. 3A, in the image forming apparatus 10, the photoelectric conversion portion 29 is disposed outside of, among opposite edges of the document sheet mounting surface 211 of the document sheet table 21 in the main scanning direction 214, an edge that is farther from the hinges 216. As a result, the photoelectric conversion portion 29 can receive external light that is incident on the peripheral of, among opposite edges of the document sheet mounting surface 211 in the main scanning direction 214, an edge farther from the pivoting axis of the ADF 1, wherein the external light may be a cause of the misidentification by the control portion 5 of the boundary between the document sheet area and the out-of-document-sheet area. Furthermore, in the image forming apparatus 10, the position of the photoelectric conversion portion 29 in the sub scanning direction 215 is the same as the home position. As a result, the photoelectric conversion portion 29 can receive external light that is incident on the peripheral of the reading position where the image data is read by the image reading portion 2 in the step S3, at a position close to the reading position.

<Step S4>

In step S4, the control portion 5 detects whether a document sheet is present or absent at the detection position on the document sheet mounting surface 211. Specifically, the control portion 5 causes the light emitting portion of the placement detecting sensor 28 to emit light, and detects whether a document sheet is present or absent at the detection position, based on an electric signal output from the light receiving portion. Here, the process of the step S4 is executed by the placement detecting portion 56 of the control portion 5.

<Step S5>

In step S5, the control portion 5 changes the threshold value based on the output value of the photoelectric conversion portion 29 obtained in the step S2. Specifically, the control portion 5 refers to the table data stored in the EEPROM and obtains an amount of change in the threshold value that is associated with the output value of the photoelectric conversion portion 29. The control portion 5 then changes the threshold value by decreasing the threshold value by the obtained amount of change in the threshold value. This allows the threshold value to reflect the influence of external light immediately before the reading of the image data in the step S3. Here, the process of the step S5 is executed by the data correcting portion 54 of the control portion 5.

<Step S6>

In step S6, the control portion 5 binalizes the image data read in the step S3 into two density levels based on the threshold value that was changed in the step S5. Specifically, the control portion 5 converts the density value of each pixel constituting the image data into 0 when it is lower than the threshold value, and converts it into 1 when it is equal to or higher than the threshold value. This simplifies the process, performed by the control portion 5, of identifying the boundary between the document sheet area and the out-of-document-sheet area from the image data. Here, the processes of the steps S5 and S6 are an example of the second step, and the process of the step S6 is executed by the data converting portion 53 of the control portion 5.

<Step S7>

In step S7, the control portion 5 detects the width, in the main scanning direction 214, of the document sheet placed on the document sheet mounting surface 211, based on the image data that was binalized in the step S6. Specifically, the control portion 5 identifies, among areas in the image data that include a predetermined number or more of continuous pixels of density value 0, an area that is the farthest from the mounting reference position 213, and identifies, among opposite edges of the identified area in the main scanning direction 214, an edge that is farther from the mounting reference position 213, as the boundary between the document sheet area and the out-of-document-sheet area. The control portion 5 then detects the width in the main scanning direction 214 of the document sheet based on the identified boundary between the document sheet area and the out-of-document-sheet area. Here, the process of the step S7 is an example of the third step, and is executed by the document sheet width detecting portion 55 of the control portion 5.

<Step S8>

In step S8, the control portion 5 detects the size of the document sheet placed on the document sheet mounting surface 211, based on the detection results of the steps S7 and S4. Specifically, the control portion 5 refers to data that is stored in the EEPROM and indicates various sizes of the document sheet, and extracts, from the data, a size of the document sheet that matches the width of the document sheet detected in the step S7. When a size of the document sheet is extracted, the control portion 5 determines the extracted size as the size of the document sheet placed on the document sheet mounting surface 211 that the control portion 5 detects. On the other hand, when a plurality of sizes of the document sheet are extracted, the control portion 5 selects one of the extracted sizes of the document sheet based on the detection result of the step S4, and determines the selected size as the size of the document sheet placed on the document sheet mounting surface 211.

The size of the document sheet detected in the step S8 is used in the control of the movement of the reading unit 22, the control of the light emitted by the light source 221, the image processing of the read image data by the control portion 5 and the like, during the image reading process that is subsequently executed in the image forming apparatus 10. Furthermore, when the image forming process is executed following the image reading process, the size of the document sheet detected in the step S8 is used for the selection of the print sheet or the like.

As described above, in the size detecting process, the threshold value is changed based on the output of the photoelectric conversion portion 29 that was output immediately before the closure of the ADF 1, wherein the threshold value is used to binalize the image data into two density levels, the image data having been read immediately before the closure of the ADF 1 for the detection of the size of the document sheet. This restricts the influence of external light on the image data that is read for the detection of the size of the document sheet, thereby making it possible to improve the detection accuracy of the document sheet size.

In addition, in the image forming apparatus 10, a solar battery is used as the photoelectric conversion portion 29 for detecting external light that is incident on the document sheet mounting surface 211 immediately before the ADF 1 is closed. As a result, it is possible to detect external light without consuming power, and in addition, it is possible to supply power output from the photoelectric conversion portion 29 to the image forming apparatus 10.

Other Embodiments

Meanwhile, another embodiment may be a configuration where the data correcting portion 54 can individually correct a plurality of pieces of image data that respectively correspond to a plurality of predetermined partial areas in the main scanning direction 214 of the document sheet mounting surface 211. Specifically, it is possible to correct the image data with respect to each of the plurality of predetermined partial areas, by allowing the data correcting portion 54 to correct the threshold value to a value that is different for each of the plurality of predetermined partial areas. This makes it possible to change the threshold value based on the easiness of the incidence of external light at each position in the main scanning direction 214 of the document sheet mounting surface 211, thereby further improving the detection accuracy of the document sheet size.

Figure 5:
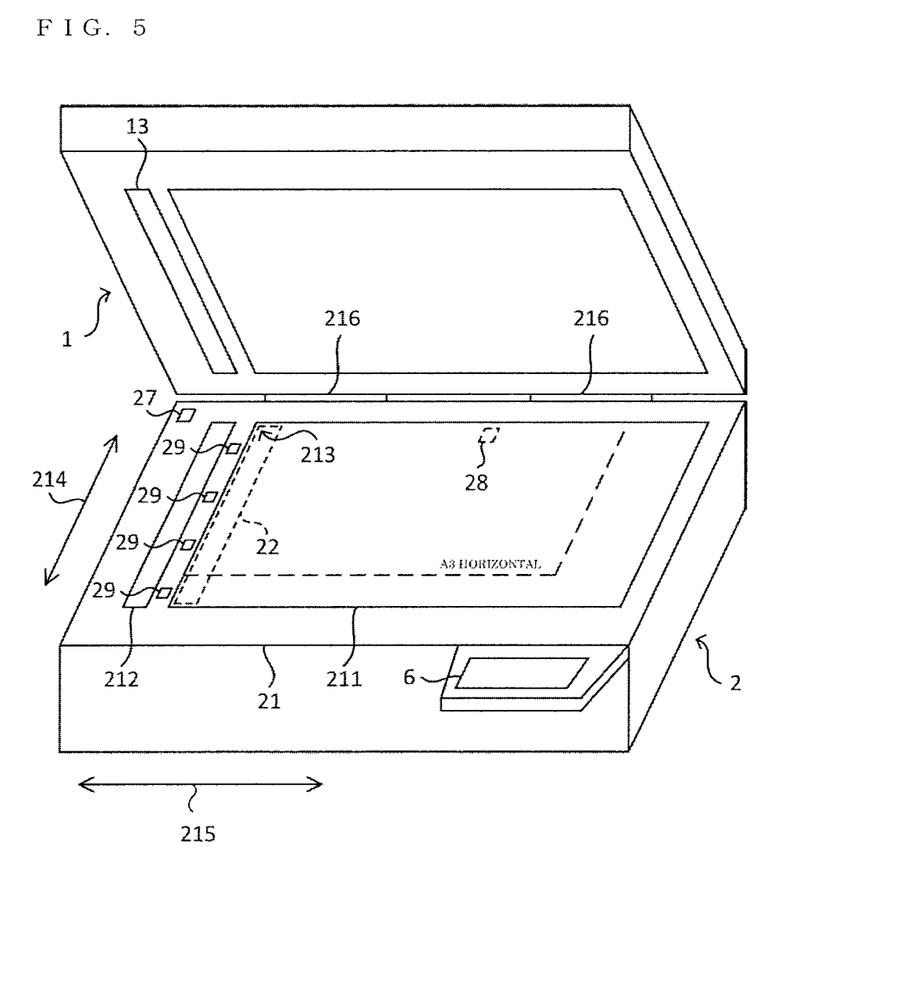
FIG. 5 is a diagram showing another example of the arrangement position of the photoelectric conversion portion of the image forming apparatus according to an embodiment of the present disclosure.

In addition, as shown in FIG. 5, for example, a plurality of photoelectric conversion portions 29 may be provided along the main scanning direction 214. In that case, the data correcting portion 54 may correct a plurality of pieces of image data that respectively correspond to the positions of the plurality of photoelectric conversion portions 29, based on the output values of the respective photoelectric conversion portions 29. This makes it possible to correct the image data by taking into account the easiness of the incidence of external light at each position in the main scanning direction 214 of the document sheet mounting surface 211.

The method by which the data correcting portion 54 corrects the image data that has been read by the reading control portion 52 is not limited to the method of changing the threshold value. For example, the data correcting portion 54 may directly correct the density value of the image data that has been read by the reading control portion 52, based on the output of the photoelectric conversion portion 29.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading apparatus comprising:
   a document sheet table including a document sheet mounting surface;
   a cover member pivotably supported with respect to the document sheet table;
   an image reading portion configured to read image data from a document sheet placed on the document sheet mounting surface;
   a reading control portion configured to cause the image reading portion to read at least a line of the image data when a pivoting angle of the cover member with respect to the document sheet table has changed from an angle exceeding a predetermined detection angle to an angle that is equal to or less than the detection angle;
   a photoelectric conversion portion disposed in an area that is out of a predetermined maximum readable size area in the image reading portion, and is covered by the cover member when the cover member is closed;

a data correcting portion configured to correct the image data read by the reading control portion, based on an output of the photoelectric conversion portion which is output when the pivoting angle has changed from an angle exceeding the detection angle to an angle that is equal to or less than the detection angle; and a document sheet width detecting portion configured to detect a width, in a main scanning direction, of the document sheet placed on the document sheet mounting surface, based on the image data corrected by the data correcting portion.

2. The image reading apparatus according to claim 1, wherein the data correcting portion includes an output value obtaining portion configured to obtain an output value of the photoelectric conversion portion when the pivoting angle has changed from an angle exceeding the detection angle to an angle that is equal to or less than the detection angle, and the reading control portion causes the image reading portion to read the image data after the output value obtaining portion obtains the output value of the photoelectric conversion portion.

3. The image reading apparatus according to claim 1, wherein the data correcting portion includes a data converting portion configured to binalize the image data read by the reading control portion, into two density levels based on a predetermined threshold value, and the data correcting portion corrects the image data by changing the threshold value based on the output of the photoelectric conversion portion which is output when the pivoting angle has changed from an angle exceeding the detection angle to an angle that is equal to or less than the detection angle.

4. The image reading apparatus according to claim 1, wherein the data correcting portion individually corrects a plurality of pieces of image data that respectively correspond to a plurality of predetermined partial areas, in the main scanning direction, of the document sheet mounting surface.

5. The image reading apparatus according to claim 1 further comprising:

a placement detecting portion configured to detect whether a document sheet is present or absent at a predetermined detection position on the document sheet mounting surface; and a size detecting portion configured to detect a size of the document sheet placed on the document sheet mounting surface, based on detection results of the document sheet width detecting portion and the placement detecting portion.

6. The image reading apparatus according to claim 1, wherein the photoelectric conversion portion is provided at a position that is outside of, among opposite edges of the document sheet mounting surface of the document sheet table in the main scanning direction, an edge that is farther from a pivoting axis of the cover member, and the position is within a range in a sub scanning direction in which the image data is read by the reading control portion.

7. The image reading apparatus according to claim 1, wherein the photoelectric conversion portion is a solar battery.

8. An image forming apparatus comprising:

the image reading apparatus according to claim 1; and an image forming portion configured to form an image based on image data read by the image reading apparatus.

9. A document sheet width detecting method that is executed by an image reading apparatus including: a document sheet table including a document sheet mounting surface; a cover member pivotably supported with respect to the document sheet table; an image reading portion configured to read image data from a document sheet placed on the document sheet mounting surface; and a photoelectric conversion portion disposed in an area that is out of a predetermined maximum readable size area in the image reading portion, and is covered by the cover member when the cover member is closed, the document sheet width detecting method comprising:

a first step of causing the image reading portion to read at least a line of the image data when a pivoting angle of the cover member with respect to the document sheet table has changed from an angle exceeding a predetermined detection angle to an angle that is equal to or less than the detection angle;

a second step of correcting the image data read in the first step, based on an output of the photoelectric conversion portion which is output when the pivoting angle has changed from an angle exceeding the detection angle to an angle that is equal to or less than the detection angle; and a third step of detecting a width, in a main scanning direction, of the document sheet placed on the document sheet mounting surface, based on the image data corrected in the second step.

* * * * *